United States Patent
Cooke et al.

(10) Patent No.: US 7,813,422 B2
(45) Date of Patent: Oct. 12, 2010

(54) ADAPTIVE EQUALIZER WITH TAP COEFFICIENT AVERAGING

(75) Inventors: Matthew E. Cooke, Potts Point (AU); Adriel P. Kind, North Ryde (AU); Long Ung, Bexley North (AU)

(73) Assignee: Agere Systems Inc., Allentown, PA (US)

( * ) Notice: Subject to any disclaimer, the term of this patent is extended or adjusted under 35 U.S.C. 154(b) by 773 days.

(21) Appl. No.: 11/710,212

(22) Filed: Feb. 23, 2007

(65) Prior Publication Data

US 2008/0205503 A1 Aug. 28, 2008

(51) Int. Cl.
*H03H 7/30* (2006.01)
*H03H 7/40* (2006.01)
*H03K 5/159* (2006.01)

(52) U.S. Cl. .............. 375/233; 375/232; 375/229; 375/230; 708/322; 708/323

(58) Field of Classification Search .......... 375/229–234, 375/250; 708/322, 323
See application file for complete search history.

(56) References Cited

U.S. PATENT DOCUMENTS

| | | | |
|---|---|---|---|
| 4,021,738 A | 5/1977 | Gitlin et al. | |
| 4,524,448 A | 6/1985 | Hullwegen | |
| 4,633,482 A | 12/1986 | Sari | |
| 5,313,411 A | 5/1994 | Tsujimoto | 708/322 |
| 5,331,663 A | 7/1994 | Kurokami | 375/233 |
| 5,493,585 A | 2/1996 | Leverington et al. | |
| 5,574,400 A | 11/1996 | Fukuchi | 330/52 |
| 5,828,589 A | 10/1998 | Degenhardt | 708/322 |
| 7,072,392 B2 | 7/2006 | Xia et al. | |

(Continued)

FOREIGN PATENT DOCUMENTS

EP  0 860 996 A2  8/1998

(Continued)

OTHER PUBLICATIONS

"Adaptive Chip-Rate Equalization of Downlink Multirate Wideband CDMA," by Adam R. Margetts et al, IEEE Transactions on Signal Processing, vol. 53, No. 6, Jun. 2005, XP011132701, pp. 2205-2215.

*Primary Examiner*—Phuong Phu
(74) *Attorney, Agent, or Firm*—Mendelsohn, Drucker & Associates, P.C.; Craig M. Brown; Steve Mendelsohn

(57) ABSTRACT

In one embodiment, a receiver has an equalizer, a tap-averaging block, a delay buffer, and a filter. The equalizer receives an input signal from upstream processing and generates sets of filter coefficients. Each set of filter coefficients is adaptively generated by 1) filtering the received signal to generate an equalized signal, 2) calculating an error of the equalized signal, and 3) generating a new set of coefficients based on the error of the equalized signal. The sets of filter coefficients are output to the tap-averaging block, which averages groups of the sets of filter coefficients to generate sets of averaged filter coefficients, where each averaged set is output to the filter. The filter receives a time-delayed version of the input signal from the delay buffer and applies the current set of averaged filter coefficients to the time-delayed signal. The filtered signal is then output to downstream processing.

14 Claims, 9 Drawing Sheets

U.S. PATENT DOCUMENTS

| | | |
|---|---|---|
| 7,269,212 B1 | 9/2007 | Chau et al. |
| 2002/0172275 A1 | 11/2002 | Birru |
| 2003/0174608 A1 | 9/2003 | Nakamura et al. |
| 2003/0219113 A1 | 11/2003 | Bershad et al. ........ 379/406.01 |
| 2004/0001426 A1 | 1/2004 | Mailaender et al. |
| 2004/0127164 A1 | 7/2004 | Mondragon-Torres et al. ....................... 455/67.11 |
| 2005/0069064 A1* | 3/2005 | Propp et al. ................. 375/350 |
| 2005/0249274 A1 | 11/2005 | Larosa et al. ............... 375/232 |
| 2006/0294170 A1 | 12/2006 | Matsuoka et al. |
| 2008/0063041 A1 | 3/2008 | Galperin et al. |

FOREIGN PATENT DOCUMENTS

| | | |
|---|---|---|
| EP | 1 372 308 A1 | 12/2003 |
| FR | 2 860 669 | 10/2003 |

* cited by examiner

TABLE I. GENERATION OF COEFFICIENTS $w(i,t)$ IN A PRIOR-ART NLMS EQUALIZER

| Receiver 100 Chip # | Coefficient Updater 110 Input | | | | Coefficient Updater 110 Output | | | |
|---|---|---|---|---|---|---|---|---|
| | Tap #4 | Tap #3 | Tap #2 | Tap #1 | Tap #4 | Tap #3 | Tap #2 | Tap #1 |
| 1 | $S_1$ | | | | | | | |
| 2 | $S_2$ | $S_1$ | | | | | | |
| 3 | $S_3$ | $S_2$ | $S_1$ | | | | | |
| 4 | $S_4$ | $S_3$ | $S_2$ | $S_1$ | $w(4,4)$ | $w(4,3)$ | $w(4,2)$ | $w(4,1)$ |
| 5 | $S_5$ | $S_4$ | $S_3$ | $S_2$ | $w(5,4)$ | $w(5,3)$ | $w(5,2)$ | $w(5,1)$ |
| 6 | $S_6$ | $S_5$ | $S_4$ | $S_3$ | $w(6,4)$ | $w(6,3)$ | $w(6,2)$ | $w(6,1)$ |
| 7 | $S_7$ | $S_6$ | $S_5$ | $S_4$ | $w(7,4)$ | $w(7,3)$ | $w(7,2)$ | $w(7,1)$ |
| 8 | $S_8$ | $S_7$ | $S_6$ | $S_5$ | $w(8,4)$ | $w(8,3)$ | $w(8,2)$ | $w(8,1)$ |
| 9 | $S_9$ | $S_8$ | $S_7$ | $S_6$ | $w(9,4)$ | $w(9,3)$ | $w(9,2)$ | $w(9,1)$ |
| ... | ... | ... | ... | ... | ... | ... | ... | ... |

1  b = 0
2  for every i mod N == 0 do tap averaging, where i is the input chip counter and b is the averaging iteration
3  {
4    b = b+1
5    For t = 1 to T x M do
6    {
7       $w_{avg}(b,t) = \dfrac{\sum\limits_{i-N+1}^{i} w(i,t)}{N}$
8    }
9  }

FIG. 4

TABLE II. GENERATION OF AVERAGED COEFFICIENTS $w_{avg}(b,t)$ ACCORDING TO ONE EMBODIMENT OF THE PRESENT INVENTION

| Receiver 300 Chip # | Tap-averaging Block 318 Input ||||  Tap Avg. 318 Iteration # | Tap-averaging Block 318 Output ||||
|---|---|---|---|---|---|---|---|---|---|
| | Tap #4 | Tap #3 | Tap #2 | Tap #1 | | Tap #4 | Tap #3 | Tap #2 | Tap #1 |
| 1 | | | | | | | | | |
| 2 | | | | | | | | | |
| 3 | | | | | | | | | |
| 4 | $w(4,4)$ | $w(4,3)$ | $w(4,2)$ | $w(4,1)$ | | | | | |
| 5 | $w(5,4)$ | $w(5,3)$ | $w(5,2)$ | $w(5,1)$ | | | | | |
| 6 | $w(6,4)$ | $w(6,3)$ | $w(6,2)$ | $w(6,1)$ | 1 | $w_{avg}(1,4)$ | $w_{avg}(1,3)$ | $w_{avg}(1,2)$ | $w_{avg}(1,1)$ |
| 7 | $w(7,4)$ | $w(7,3)$ | $w(7,2)$ | $w(7,1)$ | | | | | |
| 8 | $w(8,4)$ | $w(8,3)$ | $w(8,2)$ | $w(8,1)$ | | | | | |
| 9 | $w(9,4)$ | $w(9,3)$ | $w(9,2)$ | $w(9,1)$ | 2 | $w_{avg}(2,4)$ | $w_{avg}(2,3)$ | $wavg(2,2)$ | $w_{avg}(2,1)$ |
| ... | ... | ... | ... | ... | ... | ... | ... | ... | ... |

FIG. 5

TABLE III. APPLICATION OF AVERAGED COEFFICIENTS $w_{avg}(b,t)$ TO DELAYED SIGNAL $y_{delayed}(i)$ ACCORDING TO ONE EMBODIMENT OF THE PRESENT INVENTION

| Receiver 300 Chip # | Avg. Iteration # | Tap #4 | | Tap #3 | | Tap #2 | | Tap #1 | |
|---|---|---|---|---|---|---|---|---|---|
| | | Sample | Coefficient | Sample | Coefficient | Sample | Coefficient | Sample | Coefficient |
| 1 | | | | | | | | | |
| 2 | | | | | Delay 3 Chips | | | | |
| 3 | | | | | | | | | |
| 4 | | $S_1$ | | | | | | | |
| 5 | | $S_2$ | | $S_1$ | | | | | |
| 6 | 1 | $S_3$ | | $S_2$ | | $S_1$ | | | |
| 7 | | $S_4$ | $w_{avg}(1,4)$ | $S_3$ | $w_{avg}(1,3)$ | $S_2$ | $w_{avg}(1,2)$ | $S_1$ | $w_{avg}(1,1)$ |
| 8 | | $S_5$ | $w_{avg}(1,4)$ | $S_4$ | $w_{avg}(1,3)$ | $S_3$ | $w_{avg}(1,2)$ | $S_2$ | $w_{avg}(1,1)$ |
| 9 | 2 | $S_6$ | $w_{avg}(1,4)$ | $S_5$ | $w_{avg}(1,3)$ | $S_4$ | $w_{avg}(1,2)$ | $S_3$ | $w_{avg}(1,1)$ |
| 10 | | $S_7$ | $w_{avg}(2,4)$ | $S_6$ | $w_{avg}(2,3)$ | $S_5$ | $w_{avg}(2,2)$ | $S_4$ | $w_{avg}(2,1)$ |
| 11 | | $S_8$ | $w_{avg}(2,4)$ | $S_7$ | $w_{avg}(2,3)$ | $S_6$ | $w_{avg}(2,2)$ | $S_5$ | $w_{avg}(2,1)$ |
| 12 | | $S_9$ | $w_{avg}(2,4)$ | $S_8$ | $w_{avg}(2,3)$ | $S_7$ | $w_{avg}(2,2)$ | $S_6$ | $w_{avg}(2,1)$ |
| ... | | ... | ... | ... | ... | ... | ... | ... | ... |

1  $b = 0$
2  for every $i$ do tap averaging, where $i$ is the input chip counter and $b$ is the averaging iteration
3  {
4      $b = b+1$
5      For $t = 1$ to $T \times M$ do
6      {
7          $$w_{avg}(b,t) = \frac{\sum_{i-N+1}^{i} w(i,t)}{N}$$
8      }
9  }

FIG. 7

TABLE IV. GENERATION OF AVERAGED COEFFICIENTS $w_{avg}(b,t)$ ACCORDING TO ANOTHER EMBODIMENT OF THE PRESENT INVENTION

| Receiver 300 Chip # | Tap-averaging Block 318 Input | | | | Tap Avg. 318 Iteration # | Tap-averaging Block 318 Output | | | |
|---|---|---|---|---|---|---|---|---|---|
| | Tap #4 | Tap #3 | Tap #2 | Tap #1 | | Tap #4 | Tap #3 | Tap #2 | Tap #1 |
| 1 | | | | | | | | | |
| 2 | | | | | | | | | |
| 3 | | | | | | | | | |
| 4 | w(4,4) | w(4,3) | w(4,2) | w(4,1) | | | | | |
| 5 | w(5,4) | w(5,3) | w(5,2) | w(5,1) | | | | | |
| 6 | w(6,4) | w(6,3) | w(6,2) | w(6,1) | 1 | $w_{avg}(1,4)$ | $w_{avg}(1,3)$ | $w_{avg}(1,2)$ | $w_{avg}(1,1)$ |
| 7 | w(7,4) | w(7,3) | w(7,2) | w(7,1) | 2 | $w_{avg}(2,4)$ | $w_{avg}(2,3)$ | $w_{avg}(2,2)$ | $w_{avg}(2,1)$ |
| 8 | w(8,4) | w(8,3) | w(8,2) | w(8,1) | 3 | $w_{avg}(3,4)$ | $w_{avg}(3,3)$ | $w_{avg}(3,2)$ | $w_{avg}(3,1)$ |
| 9 | w(9,4) | w(9,3) | w(9,2) | w(9,1) | 4 | $w_{avg}(4,4)$ | $w_{avg}(4,3)$ | $w_{avg}(4,2)$ | $w_{avg}(4,1)$ |
| ... | ... | ... | ... | ... | ... | ... | ... | ... | ... |

FIG. 8

TABLE V. APPLICATION OF AVERAGED COEFFICIENTS $w_{avg}(b,t)$ TO DELAYED SIGNAL $y_{delayed}(i)$ ACCORDING TO ANOTHER EMBODIMENT OF THE PRESENT INVENTION

| Receiver 300 Chip # | Avg. Iteration # | Tap #4 | | Tap #3 | | Tap #2 | | Tap #1 | |
|---|---|---|---|---|---|---|---|---|---|
| | | Sample | Coefficient | Sample | Coefficient | Sample | Coefficient | Sample | Coefficient |
| 1 | | | | | | | | | |
| 2 | | | | | | Delay 3 Chips | | | |
| 3 | | | | | | | | | |
| 4 | | $S_1$ | | | | | | | |
| 5 | | $S_2$ | | $S_1$ | | | | | |
| 6 | 1 | $S_3$ | | $S_2$ | | $S_1$ | | | |
| 7 | 2 | $S_4$ | $w_{avg}(1,4)$ | $S_3$ | $w_{avg}(1,3)$ | $S_2$ | $w_{avg}(1,2)$ | $S_1$ | $w_{avg}(1,1)$ |
| 8 | 3 | $S_5$ | $w_{avg}(2,4)$ | $S_4$ | $w_{avg}(2,3)$ | $S_3$ | $w_{avg}(2,2)$ | $S_2$ | $w_{avg}(2,1)$ |
| 9 | 4 | $S_6$ | $w_{avg}(3,4)$ | $S_5$ | $w_{avg}(3,3)$ | $S_4$ | $w_{avg}(3,2)$ | $S_3$ | $w_{avg}(3,1)$ |
| 10 | 5 | $S_7$ | $w_{avg}(4,4)$ | $S_6$ | $w_{avg}(4,3)$ | $S_5$ | $w_{avg}(4,2)$ | $S_4$ | $w_{avg}(4,1)$ |
| 11 | 6 | $S_8$ | $w_{avg}(5,4)$ | $S_7$ | $w_{avg}(5,3)$ | $S_6$ | $w_{avg}(5,2)$ | $S_5$ | $w_{avg}(5,1)$ |
| 12 | 7 | $S_9$ | $w_{avg}(6,4)$ | $S_8$ | $w_{avg}(6,3)$ | $S_7$ | $w_{avg}(6,2)$ | $S_6$ | $w_{avg}(6,1)$ |
| ... | ... | ... | ... | ... | ... | ... | ... | ... | ... |

FIG. 9

ADAPTIVE EQUALIZER WITH TAP COEFFICIENT AVERAGING

BACKGROUND OF THE INVENTION

1. Field of the Invention

The present invention relates to signal processing equalizers, and, more specifically, to tap coefficient calculations for such devices.

2. Description of the Related Art

FIG. 1 shows a block diagram of one implementation of a prior-art chip-rate receiver 100. Receiver 100 has upstream processing 102, chip-rate normalized-least-mean-squares (NLMS) equalizer 104, and downstream processing 106. Upstream processing 102 performs pre-equalization processing which might include analog-to-digital conversion, root-raised-cosine filtering, or other processing to prepare a received signal for equalization. NLMS equalizer 104 receives digital data y(i) from upstream processing 102, equalizes signal y(i) to closely approximate the originally transmitted signal, and outputs equalized signal x̂(i) to downstream processing 106. Downstream processing 106 then performs post-equalization processing, which might include de-scrambling, de-spreading, symbol estimation, data symbol de-mapping, or other post-equalization processing for recovering one or more output data streams from the received signal.

NLMS equalizer 104 equalizes digital signal y(i) using an update loop that comprises finite impulse response (FIR) filter 108, coefficient updater 110, and error calculator 112. During each iteration of the update loop, FIR filter 108 receives a chip of signal y(i), where the number of samples per chip is equal to M. Additionally, FIR filter 108 receives a set of coefficients, where each coefficient w(i,t) corresponds to a tap t of FIR filter 108. Note that FIR filter 108 has a length of T chips, and therefore, has a number of taps t equal to T×M. Furthermore, since each coefficient w(i,t) corresponds to a tap t, the coefficients range from w(i, 1), ..., w(i, T×M). Each tap t multiplies a sample of signal y(i) by the corresponding coefficient w(i,t). The tap outputs are summed to form a chip of equalized signal x̂(i). After each iteration of the update loop, FIR filter 108 outputs equalized signal x̂(i) to downstream processing 106 and error calculator 112.

Error calculator 112 calculates error e(i) of equalized signal x̂(i) during each iteration of the update loop by comparing signal x̂(i) to an expected value z(i). In conventional transmissions, expected value z(i) is a pilot signal that is known to the receiver. As the difference between expected value z(i) and equalized signal x̂(i) decreases, equalized output x̂(i) more closely approximates the originally transmitted signal. Error signal e(i) is then output to coefficient updater 110.

Coefficient updater 110 calculates a new set of coefficients w(i,t) during each iteration of the update loop based on received signal y(i) and error signal e(i). As an example of the generation of coefficients w(i,t), assume that the length T of FIR filter 108 is equal to 4 and that the number M of samples per chip is equal to 1 (i.e., T×M=4). The generation of coefficients w(i,t) in this example is shown in Table I of FIG. 2. As shown, coefficient updater 110 does not begin generating coefficients w(i,t) until each position corresponding to a tap t of FIR filter 108 is matched with a sample $S_i$. Once this occurs, coefficient updater 110 generates coefficients w(4,4), w(4,3), w(4,2), and w(4,1), which correspond to samples $S_4$, $S_3$, $S_2$, and $S_1$, respectively. After one chip of signal y(i) (i.e., an iteration), coefficient updater 110 generates new coefficients w(5,4), w(5,3), w(5,2), and w(5,1), which correspond to samples $S_5$, $S_4$, $S_3$, and $S_2$, respectively. This process continues for each subsequent chip of signal y(i).

Coefficients w(i,t) are calculated using an NLMS algorithm that employs a step size Δ to gradually step the error of each sample of y(i) toward a minimum value of the mean squared error (MSE). In relatively high-speed mobile environments (e.g., where the mobile station is traveling at speeds greater than 30 km/h), step size Δ should be chosen so that NLMS equalizer 104 can adapt quickly to channel changes (e.g., fast fading). Thus, as the speed of the mobile environment increases, step size Δ should be increased to allow for quicker tracking of the channel. However, as step size Δ is increased, NLMS equalizer 104 can overestimate the MSE. This overestimation induces adaptation noise in the coefficient calculations, which reduces the accuracy of coefficients w(i,t), which in turn can lead to errors in downstream processing 106.

SUMMARY OF THE INVENTION

In one embodiment, the present invention is a method for equalizing a received signal. The method comprises: (1) generating sets of filter coefficients based on the received signal, (2) averaging groups of the sets of filter coefficients to generate sets of averaged filter coefficients, and (3) filtering the received signal based on the sets of averaged filter coefficients to generate an equalized output signal.

In another embodiment, the present invention is an apparatus for equalizing a received signal. The apparatus comprises: (1) an equalizer adapted to generate sets of filter coefficients based on the received signal, (2) a tap-averaging block adapted to average groups of the sets of filter coefficients to generate sets of averaged filter coefficients, and (3) a first filter adapted to filter the received signal based on the sets of averaged filter coefficients to generate an equalized output signal.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 2 shows Table I which illustrates an example of the generation of coefficients according to one embodiment of a prior-art NLMS equalizer;

FIG. 4 shows pseudocode used by the receiver of FIG. 3 to average sets of tap coefficients according to one embodiment of the present invention;

FIG. 5 shows Table II which illustrates an example of the generation of averaged coefficients according to one embodiment of the present invention;

FIG. 6 shows Table III which illustrates an example of the application of the averaged coefficients of Table II to a received signal according to one embodiment of a prior-art NLMS equalizer;

FIG. 7 shows pseudocode used by the receiver of FIG. 3 to average sets of tap coefficients according to another embodiment of the present invention;

FIG. 8 shows Table IV which illustrates an example of the generation of averaged coefficients according to another embodiment of the present invention; and FIG. 9 shows Table V which illustrates an example of the application of the averaged coefficients of Table IV to a received signal according to another embodiment of a prior-art NLMS equalizer.

DETAILED DESCRIPTION

Figure 1:
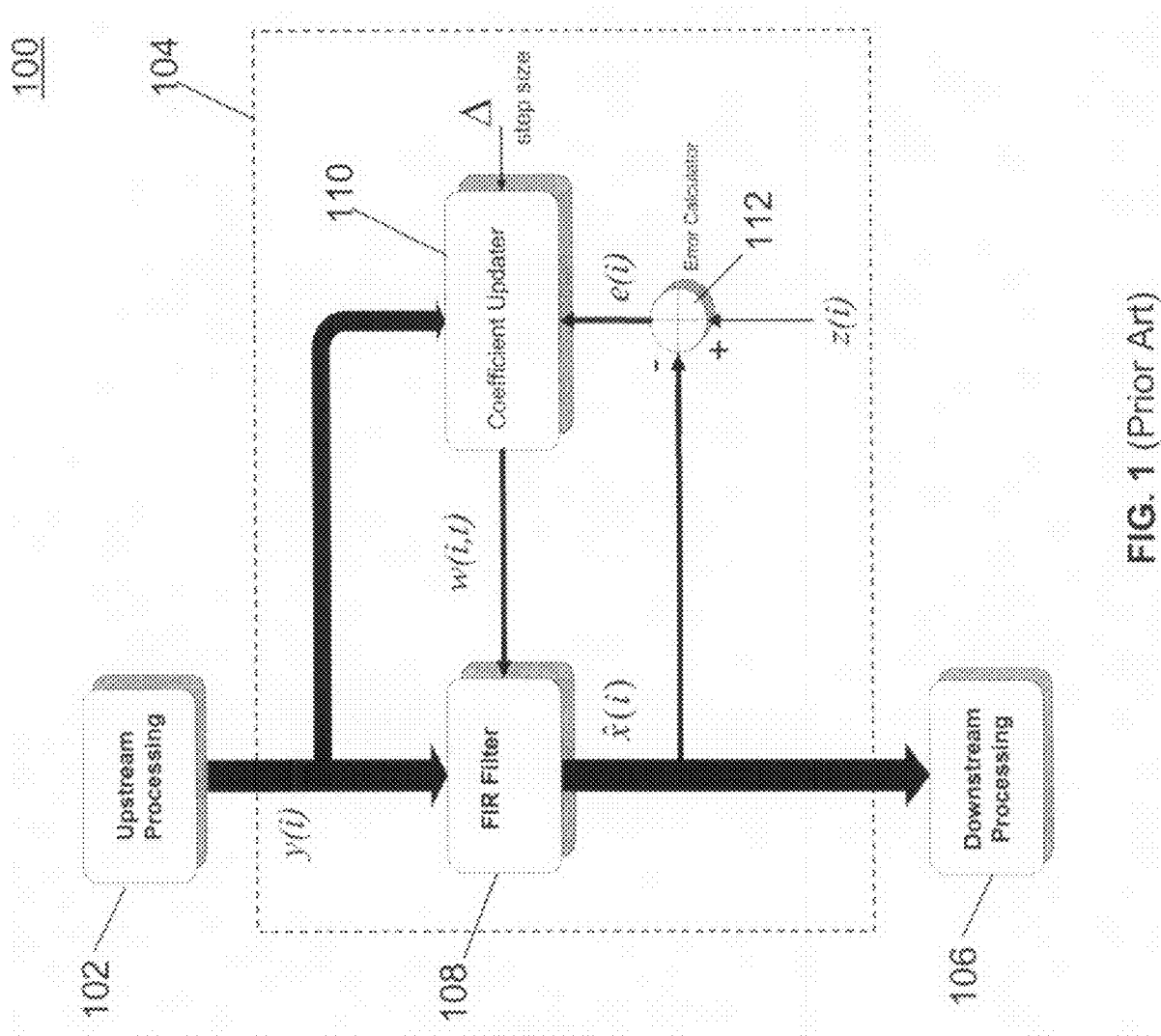
FIG. 1 shows a simplified block diagram of one implementation of a prior-art receiver.
Figure 3:
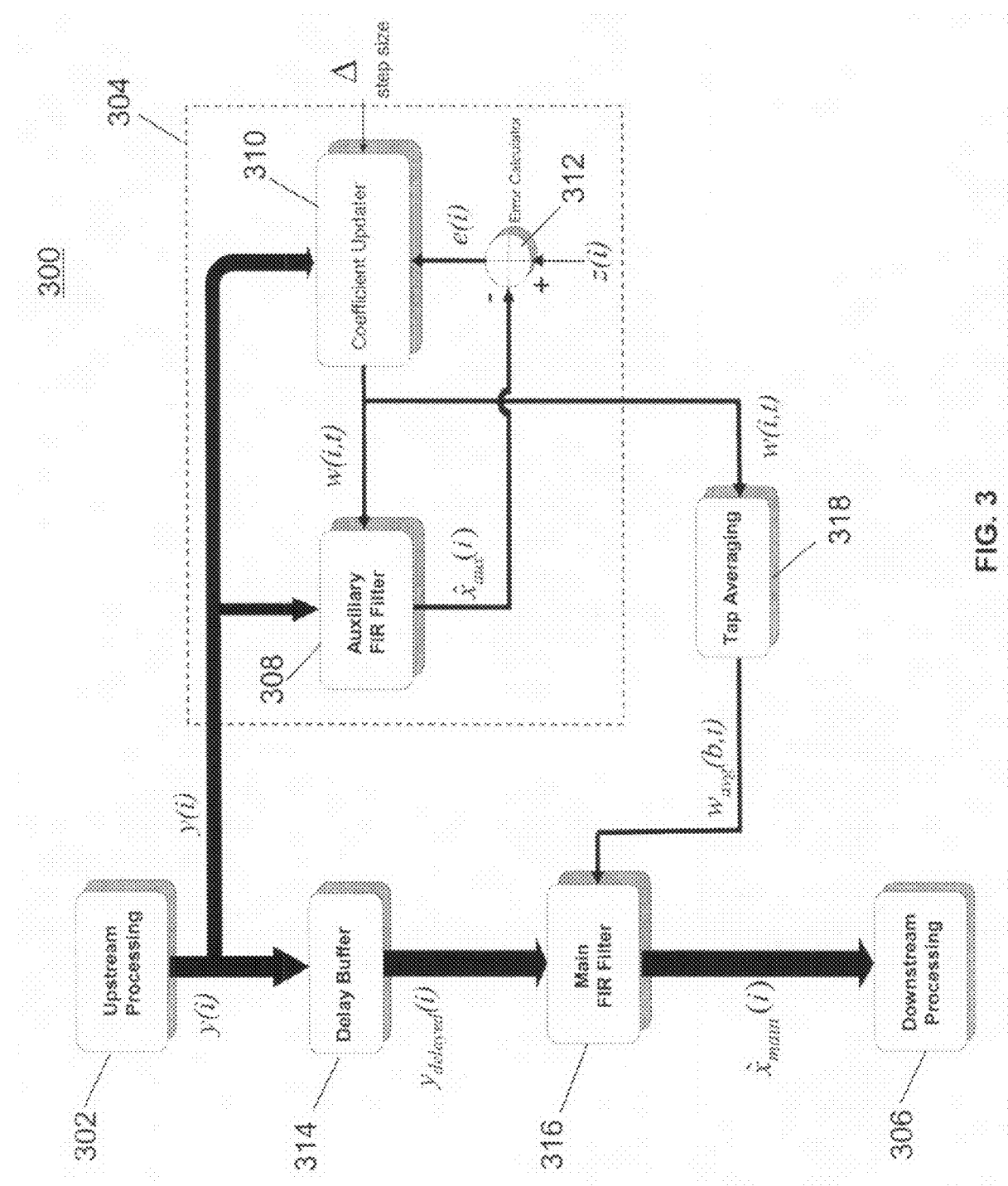
FIG. 3 shows a simplified block diagram of a receiver according to one embodiment of the present invention.

FIG. 3 shows a simplified block diagram of a chip-rate receiver 300 according to one embodiment of the present invention. Receiver 300 has upstream processing 302, delay buffer 314, main finite impulse response (FIR) filter 316, downstream processing 306, chip-rate normalized-least-mean-squares (NLMS) equalizer 304, and tap-averaging block 318. Upstream processing 302 performs operations analogous to those of upstream processing 102 of prior-art receiver 100 of FIG. 1, and provides received signal y(i) to NLMS equalizer 304 and delay buffer 314.

NLMS equalizer 304 has auxiliary FIR filter 308, coefficient updater 310, and error calculator 312, which perform operations analogous to those of FIR filter 108, coefficient updater 110, and error calculator 112 of NLMS equalizer 104. Note, however, that, while FIR filter 108 outputs equalized signal $\hat{x}(i)$ to error calculator 112 and downstream processing 106, auxiliary FIR filter 308 outputs equalized signal $\hat{x}_{aux}(i)$ only to error calculator 312. Furthermore, coefficient updater 110 outputs sets of coefficients w(i,t) to FIR filter 108, while coefficient updater 310 outputs sets of coefficients w(i,t) to auxiliary FIR filter 308 and tap-averaging block 318.

Delay buffer 314 can be modeled as a first-in, first-out queue. Delay buffer 314 receives signal y(i) at a rate of one chip per iteration of receiver 300, where the number of samples per chip is equal to M. Each chip of signal y(i) is then delayed by N chips and output as delayed signal $y_{delayed}(i)$.

During each iteration of receiver 300, main FIR filter 316 receives one chip of delayed signal $y_{delayed}(i)$. Additionally, main FIR filter 316 receives a set of coefficients $w_{avg}(b,t)$ from tap-averaging block 318, where each coefficient $w_{avg}(b,t)$ corresponds to a tap t of FIR filter 316. Note that the number of taps t of main FIR filter 316 filters is equal to the number of taps t of auxiliary FIR filter 308. Each tap t then multiplies a sample of delayed signal $y_{delayed}(i)$ by a coefficient $w_{avg}(b,t)$. The tap outputs are summed to form a chip of equalized signal $\hat{x}_{main}(i)$. After each filtering operation, FIR filter 316 outputs equalized signal $\hat{x}_{main}(i)$ to downstream processing 306, which performs operations analogous to those of downstream processing 106.

Tap-averaging block 318 receives each set of coefficients w(i,t) generated by coefficient updater 310 and averages groups of the sets of coefficients, where each group comprises N sets of coefficients w(i,t). Averaging may be performed using any one of a number of methods. Tap-averaging block 318 then outputs averaged coefficients $w_{avg}(b,t)$ to main FIR filter 316, where b represents the averaging iteration number.

FIG. 4 shows pseudocode 400 used by tap-averaging block 318 to average sets of coefficients w(i,t) according to one embodiment of the present invention. In this embodiment, pseudocode 400 performs an averaging operation each time N sets of coefficients are generated. As an example of the generation of averaged coefficients according to this embodiment, assume that NLMS equalizer 304 outputs the same coefficients w(i,t) as shown in the prior-art example of Table I. Furthermore, assume that tap-averaging block 318 averages a number N of sets of coefficients which is equal to 3. The generation of averaged coefficients $w_{avg}(b,t)$ according to this embodiment is shown in Table II of FIG. 5.

In this example, averaged coefficients $w_{avg}(1,4)$, $w_{avg}(1,3)$, $w_{avg}(1,2)$, and $w_{avg}(1,1)$ are generated during averaging iteration number 1. Furthermore, $w_{avg}(1,4)$ is generated from w(4,4), w(5,4), and w(6,4); $w_{avg}(1,3)$ is generated from w(4,3), w(5,3), and w(6,3); $w_{avg}(1,2)$ is generated from w(4,2), w(5,2), and w(6,2); and $w_{avg}(1,1)$ is generated from w(4,1), w(5,1), and w(6,1). Averaging iteration number 2 produces $w_{avg}(2,4)$, $w_{avg}(2,3)$, $w_{avg}(2,2)$, and $w_{avg}(2,1)$ from a different set of coefficients from those used in averaging iteration number 1. Averaged coefficient $w_{avg}(2,4)$ is generated from w(7,4), w(8,4), and w(9,4); $w_{avg}(2,3)$ is generated from w(7,3), w(8,3), and w(9,3); $w_{avg}(2,2)$ is generated from w(7,2), w(8,2), and w(9,2); and $w_{avg}(2,1)$ is generated from w(7,1), w(8,1), and w(9,1). This process is continued for averaging iteration number 3, and so on.

Note that, in this embodiment, tap-averaging block 318 outputs averaged coefficients $w_{avg}(b,t)$ only every 3 chips of receiver 300. Since main FIR filter 316 performs a filtering operation after each chip of signal $y_{delayed}(i)$, each set of averaged coefficients $w_{avg}(b,t)$ is used three times by main FIR filter 316 to equalize signal $y_{delayed}(i)$.

The application of averaged coefficients $w_{avg}(b,t)$ by main FIR filter 316 according to this embodiment is shown in Table III of FIG. 6. As shown, received signal y(i) is delayed by 3 chips to produce $y_{delayed}(i)$. Additionally, main FIR filter 316 is not started until each tap t of main FIR filter 316 is matched with a sample $S_i$. Main FIR filter 316 receives the first set of averaged coefficients $w_{avg}(1,t)$ after averaging iteration 1 of tap-averaging block 318. The first set of averaged coefficients $w_{avg}(1,t)$ is then applied to signal $y_{delayed}(i)$ during iterations 7, 8, and 9 of receiver 300. The second set of averaged coefficients $w_{avg}(2,t)$ is received after averaging iteration number 2 of tap-averaging block 318 and this set is applied to $y_{delayed}(i)$ during iterations 10, 11, and 12 of receiver 300. This process continues for receiver iteration number 13, and so on.

FIG. 7 shows pseudocode 700 used by tap-averaging block 318 to average sets of coefficients w(i,t) according to another embodiment of the present invention. In this embodiment, pseudocode 700 performs an averaging operation each time a new set of coefficients w(i,t) is generated (i.e., each chip of receiver 300). As an example of the generation of averaged coefficients $w_{avg}(b,t)$ according to this embodiment, assume that NLMS equalizer 304 outputs the same coefficients w(i,t) as shown in the prior-art example of Table I. Furthermore, assume that tap-averaging block 318 averages a number N of sets of coefficients which is equal to 3. The averaging of coefficients w(i,t) according to this embodiment is shown in Table IV of FIG. 8.

In this example, averaging iteration number 1 produces averaged coefficients $w_{avg}(1,4)$, $w_{avg}(1,3)$, $w_{avg}(1,2)$, and $w_{avg}(1,1)$, where $w_{avg}(1,4)$ is generated from w(4,4), w(5,4), and w(6,4); $w_{avg}(1,3)$ is generated from w(4,3), w(5,3), and w(6,3); $w_{avg}(1,2)$ is generated from w(4,2), w(5,2), and w(6,2); and $w_{avg}(1,1)$ is generated from w(4,1), w(5,1), and w(6,1). Averaging iteration number 2 produces averaged coefficients $w_{avg}(2,4)$, $w_{avg}(2,3)$, $w_{avg}(2,2)$, and $w_{avg}(2,1)$, where $w_{avg}(2,4)$ is generated from w(5,4), w(6,4), and w(7,4); $w_{avg}(2,3)$ is generated from w(5,3), w(6,3), and w(7,3); $w_{avg}(2,2)$ is generated from w(5,2), w(6,2), and w(7,2); and $w_{avg}(2,1)$ is generated from w(5,1), w(6,1), and w(7,1). This process is continued for averaging iteration 3, and so on.

Note that, in this embodiment, tap-averaging block 318 outputs averaged coefficients $w_{avg}(b,t)$ every chip of receiver 300. Since main FIR filter 316 performs a filtering operation after each chip of signal $y_{delayed}(i)$, each set of averaged coefficients $w_{avg}(b,t)$ is used one time by main FIR filter 316 to equalize signal $y_{delayed}(i)$.

The application of averaged coefficients $w_{avg}(b,t)$ by main FIR filter 316 according to this embodiment is shown in Table V of FIG. 9. Similar to the previous example, main FIR filter 316 receives the first set of averaged coefficients $w_{avg}(1,t)$ after averaging iteration 1 of tap-averaging block 318. The first set of averaged coefficients $w_{avg}(1,t)$ is then applied to signal $y_{delayed}(i)$ only during iteration 7 of receiver 300. The second set of averaged coefficients $w_{avg}(2,t)$ is received after averaging iteration 2 of tap-averaging block 318, and this set is applied to $y_{delayed}(i)$ only during iteration 8 of receiver 300. This process continues for receiver 300 iteration number 9, and so on.

As described in the prior art, the calculation of coefficients $w(i,t)$ can induce adaptation noise in the receiver. By maintaining the step size $\Delta$ and by averaging coefficients $w(i,t)$, receiver 300 can reduce this adaptation noise. As a result, averaged coefficients $w_{avg}(b,t)$ can be more accurate than coefficients $w(i,t)$. On the other hand, by increasing step size $\Delta$ and by averaging coefficients $w(i,t)$, receiver 300 can improve channel tracking while maintaining the accuracy of the receiver. Other implementations can achieve both improved channel tracking and greater accuracy by averaging coefficients $w(i,t)$ and only partially increasing step size $\Delta$.

According to alternative embodiments of the present invention, signal $y(i)$ may be delayed by a factor other than N chips or the output of tap-averaging block 318 may be delayed. In so doing, averaged coefficients $w_{avg}(b,t)$ can be applied to samples other than those shown in Tables III and V. For instance, in the example of Table V, $w_{avg}(1,4)$ was generated by averaging $w(4,4), w(5,4),$ and $w(6,4)$ (see Table IV). Instead of applying $w_{avg}(1,4)$ to sample $S_4$, $w_{avg}(1,4)$ could be applied to another sample including but not limited to $S_5$ and $S_6$.

Additional embodiments of the present invention may be envisioned in which the number N of coefficients $w(i,t)$ averaged differs from the number of filtering operations in which the averaged coefficients $w_{avg}(b,t)$ are used. For example, tap-averaging block 318 could generate a set of averaged coefficients $w_{avg}(b,t)$ from four sets of coefficients $w(i,t)$. Then, FIR filter 316 could use each set of averaged coefficients $w_{avg}(b,t)$ for two filtering operations.

According to other embodiments of the present invention, the number M of samples per chip, the filter length T, and the number N of sets of coefficients in an average may differ from the examples provided above. Furthermore, receiver 300 may operate at a rate other than one iteration per chip.

According to further embodiments of the present invention, receiver 300 may employ oversampling where signal $y(i)$ is oversampled by a specified factor.

While the present invention was described using an NLMS equalizer to generate the sets of coefficients $w(i,t)$, the present invention is not so limited. Alternative embodiments of the present invention may be envisioned in which the receiver employs an equalizer other than an NLMS equalizer such as an LMS equalizer, a recursive least-squares equalizer, and any other equalizer commonly known in the art that adaptively generates coefficients. Furthermore, the present invention is not limited to the use of FIR filters. Other filters may be used without departing from the scope of this invention, including but not limited to infinite impulse response (IIR) filters.

It will be further understood that various changes in the details, materials, and arrangements of the parts which have been described and illustrated in order to explain the nature of this invention may be made by those skilled in the art without departing from the scope of the invention as expressed in the following claims. For example, although the present invention was described in terms of equalizing a digital signal, the present invention is not so limited. The present invention may also be used to equalize an analog signal.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A receiver implemented method for equalizing a received signal, the method comprising:
   (a) the receiver generating sets of filter coefficients based on the received signal;
   (b) the receiver averaging groups of the sets of filter coefficients to generate sets of averaged filter coefficients; and
   (c) the receiver filtering the received signal based on the sets of averaged filter coefficients to generate an equalized output signal, wherein step (a) comprises:
      (a1) filtering the received signal to obtain an equalized auxiliary signal;
      (a2) calculating an error signal based on the equalized auxiliary signal; and
      (a3) adaptively generating the sets of filter coefficients based on the error signal, wherein:
   each group comprises N sets of filter coefficients, N>1; and
   each set of averaged filter coefficients is used in step (c) fewer than N times.

2. The invention of claim 1, wherein step (c) comprises:
   (c1) delaying the received signal to generate a delayed signal; and
   (c2) filtering the delayed signal based on the sets of averaged filter coefficients to generate the equalized output signal.

3. The invention of claim 1, wherein each set of averaged filter coefficients is used only once in step (c).

4. An apparatus for equalizing a received signal, the apparatus comprising:
   (a) an equalizer adapted to generate sets of filter coefficients based on the received signal;
   (b) a tap-averaging block adapted to average groups of the sets of filter coefficients to generate sets of averaged filter coefficients; and
   (c) a first filter adapted to filter the received signal based on the sets of averaged filter coefficients to generate an equalized output signal, wherein the equalizer comprises:
      (a1) a second filter adapted to filter the received signal to obtain an equalized auxiliary signal;
   the apparatus further comprises means for delaying the received signal to generate a delayed signal; and
   means (c) is adapted to filter the delayed signal based on the sets of averaged filter coefficients to generate the equalized output signal.

5. The invention of claim 4, wherein:
   the apparatus further comprises a delay buffer adapted to delay the received signal to generate a delayed signal; and
   the first filter is adapted to filter the delayed signal based on the sets of averaged filter coefficients to generate the equalized output signal.

6. The invention of claim 4, wherein the first filter is adapted to use each set of averaged filter coefficients only once.

7. The invention of claim 4, wherein the apparatus is implemented in an integrated circuit.

8. An apparatus for equalizing a received signal, the apparatus comprising:
   (a) a means for generating sets of filter coefficients based on the received signal;
   (b) a means for averaging groups of the sets of filter coefficients to generate sets of averaged filter coefficients; and
   (c) a means for filtering the received signal based on the sets of averaged filter coefficients to generate an equalized output signal, wherein means (a) comprises:
      (a1) means for filtering the received signal to obtain an equalized auxiliary signal;
      (a2) means for calculating an error signal based on the equalized auxiliary signal; and
      (a3) means for adaptively generating the sets of filter coefficients based on the error signal, wherein:
   each group comprises N sets of filter coefficients, N>1; and
   means (c) is adapted to use each set of averaged filter coefficients fewer than N times.

9. The invention of claim 8, wherein:
   (a2) an error calculator adapted to calculate an error signal based on the equalized auxiliary signal; and
   (a3) a coefficient generator adapted to adaptively generate the sets of filter coefficients based on the error signal, wherein:
   each group comprises N sets of filter coefficients, N>1; and
   the first filter is adapted to use each set of averaged filter coefficients at least N times.

10. The invention of claim 8, wherein means (c) is adapted to use each set of averaged filter coefficients only once.

11. The invention of claim 8, wherein the apparatus is implemented in an integrated circuit.

12. A receiver implemented method for equalizing a received signal, the method comprising:
   (a) the receiver generating sets of filter coefficients based on the received signal;
   (b) the receiver averaging groups of the sets of filter coefficients to generate sets of averaged filter coefficients; and
   (c) the receiver filtering the received signal based on the sets of averaged filter coefficients to generate an equalized output signal, wherein step (a) comprises:
      (a1) filtering the received signal to obtain an equalized auxiliary signal;
      (a2) calculating an error signal based on the equalized auxiliary signal; and
      (a3) adaptively generating the sets of filter coefficients based on the error signal, wherein:
   each group comprises N sets of filter coefficients, N>1; and
   each set of averaged filter coefficients is used in step (c) at least N times.

13. An apparatus for equalizing a received signal, the apparatus comprising:
   (a) an equalizer adapted to generate sets of filter coefficients based on the received signal;
   (b) a tap-averaging block adapted to average groups of the sets of filter coefficients to generate sets of averaged filter coefficients; and
   (c) a first filter adapted to filter the received signal based on the sets of averaged filter coefficients to generate an equalized output signal, wherein the equalizer comprises:
      (a1) a second filter adapted to filter the received signal to obtain an equalized auxiliary signal;
      (a2) an error calculator adapted to calculate an error signal based on the equalized auxiliary signal; and
      (a3) a coefficient generator adapted to adaptively generate the sets of filter coefficients based on the error signal, wherein:

each group comprises N sets of filter coefficients, N>1; and
the first filter is adapted to use each set of averaged filter coefficients fewer than N times.

14. An apparatus for equalizing a received signal, the apparatus comprising:
(a) a means for generating sets of filter coefficients based on the received signal;
(b) a means for averaging groups of the sets of filter coefficients to generate sets of averaged filter coefficients; and
(c) a means for filtering the received signal based on the sets of averaged filter coefficients to generate an equalized output signal, wherein means (a) comprises:
(a1) means for filtering the received signal to obtain an equalized auxiliary signal;
(a2) means for calculating an error signal based on the equalized auxiliary signal; and
(a3) means for adaptively generating the sets of filter coefficients based on the error signal, wherein:

each group comprises N sets of filter coefficients, N>1; and means (c) is adapted to use each set of averaged filter coefficients at least N times.

* * * * *

UNITED STATES PATENT AND TRADEMARK OFFICE
CERTIFICATE OF CORRECTION

PATENT NO. : 7,813,422 B2
APPLICATION NO. : 11/710212
DATED : October 12, 2010
INVENTOR(S) : Matthew E. Cooke, Adriel P. Kind and Long Ung It is certified that error appears in the above-identified patent and that said Letters Patent is hereby corrected as shown below:

In Column 7, Lines 46-50, please replace

"the apparatus further comprises means for delaying the received signal to generate a delayed signal; and means (c) is adapted to filter the delayed signal based on the sets of averaged filter coefficients to generate the equalized output signal."

with

-- (a2) an error calculator adapted to calculate an error signal based on the equalized auxiliary signal; and
(a3) a coefficient generator adapted to adaptively generate the sets of filter coefficients based on the error signal, wherein:
each group comprises $N$ sets of filter coefficients, $N>1$; and
the first filter is adapted to use each set of averaged filter coefficients fewer than $N$ times. --

In Column 8, Lines 17-24, please replace

"(a2) an error calculator adapted to calculate an error signal based on the equalized auxiliary signal; and
(a3) a coefficient generator adapted to adaptively generate the sets of filter coefficients based on the error signal, wherein:
each group comprises $N$ sets of filter coefficients, $N>1$; and
the first filter is adapted to use each set of averaged filter coefficients fewer than $N$ times."

with
-- the apparatus further comprises means for delaying the received signal to generate a delayed signal; and means (c) is adapted to filter the delayed signal based on the sets of averaged filter coefficients to generate the equalized output signal. --

Signed and Sealed this
Twenty-second Day of February, 2011

David J. Kappos
*Director of the United States Patent and Trademark Office*